United States Patent
Itoigawa et al.

(10) Patent No.: US 6,889,408 B2
(45) Date of Patent: May 10, 2005

(54) BUCKLE APPARATUS

(75) Inventors: Kouichi Itoigawa, Aichi-ken (JP); Hitoshi Muraki, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 10/282,248

(22) Filed: Oct. 29, 2002

(65) Prior Publication Data

US 2003/0101553 A1 Jun. 5, 2003

(30) Foreign Application Priority Data

Oct. 29, 2001 (JP) ........................................ 2001-330817

(51) Int. Cl.⁷ .............................................. A44B 11/25
(52) U.S. Cl. .......................................... 24/633; 24/303
(58) Field of Search ................ 24/303, 633; 280/801.1, 280/808

(56) References Cited

U.S. PATENT DOCUMENTS

| | | | | |
|---|---|---|---|---|
| 4,943,087 A | * | 7/1990 | Sasaki ......................... | 280/804 |
| 5,233,732 A | * | 8/1993 | Yamanishi .................... | 24/303 |
| 5,648,885 A | * | 7/1997 | Nishioka et al. ........ | 360/324.12 |
| 5,752,299 A | | 5/1998 | Vivacqua et al. | |
| 5,839,174 A | * | 11/1998 | Chamings et al. ............ | 24/633 |
| 5,960,523 A | | 10/1999 | Husby et al. | |
| 5,966,784 A | * | 10/1999 | Arbogast et al. ............. | 24/633 |
| 6,079,744 A | * | 6/2000 | Husby et al. ............ | 280/801.1 |
| 6,082,481 A | * | 7/2000 | Engler ........................ | 180/268 |
| 6,175,304 B1 | * | 1/2001 | Becker .................... | 340/457.1 |
| 6,230,088 B1 | * | 5/2001 | Husby ......................... | 701/45 |
| 6,381,815 B1 | * | 5/2002 | Yamaguchi et al. .......... | 24/633 |
| 2001/0025403 A1 | * | 10/2001 | Kanbe et al. | |

* cited by examiner

Primary Examiner—Robert J. Sandy
Assistant Examiner—Andre' L. Jackson
(74) Attorney, Agent, or Firm—Nixon Peabody LLP

(57) ABSTRACT

A buckle apparatus in which a permanent magnet and GMR element are provided. The polar axis of the permanent magnet is transverse to the direction a tongue plate is inserted. A shielding member is provided to an ejector of the buckle apparatus via a lever. When an inserted tongue plate of a vehicle seat belt pushes and moves the ejector as far as a position at which an engaging piece can engage with a through-hole, the shielding member is interposed between the permanent magnet and the GMR element, and the shielding member shields lines of magnetic force from the permanent magnet toward the GMR element. As a result, magnetic forces lines penetrating the GMR element are greatly reduced, and an electrical resistance value of the GMR element is suddenly and greatly changed. Thus, a buckle apparatus is provided which includes a detection mechanism that can reliably detect when the tongue plate has been inserted into the apparatus main body.

8 Claims, 6 Drawing Sheets

BUCKLE APPARATUS

BACKGROUND OF THE INVENTION

1. Field of the Invention

The present invention relates to a buckle apparatus for fixing a tongue plate used at a seat belt apparatus of a vehicle.

2. Description of the Related Art

A webbing belt structures a seat belt apparatus for restraining the body of an occupant sitting in a seat of a vehicle. One end portion in a longitudinal direction of the webbing belt is engaged with, for example, a winding shaft of a winding apparatus provided at a side of the seat. The other end portion is fixed at an anchor plate provided at a vicinity of the winding apparatus. A longitudinal direction central portion of the webbing belt passes through, for example, an insertion hole of a through-anchor provided upward of the winding apparatus, at an upper side of a center pillar of the vehicle, and is turned downward.

The webbing belt, between the portion that turns down at the through-anchor and the other end, passes through an insertion hole of a tongue plate. When this tongue plate is pulled on, the webbing belt wound around the winding shaft of the winding apparatus is pulled out. When the tongue plate is coupled with a buckle apparatus, which is provided at a side of the seat opposite to a side thereof at which the winding apparatus is disposed, the webbing belt is in an engaged state.

Some vehicles are equipped with a warning mechanism which, when an occupant is sitting in the seat but the webbing belt is not in the engaged state, lights up an indicator or the like provided at an instrument panel of the vehicle or the like, and warns that the webbing belt is not engaged.

As an example of this warning mechanism, a structure has been devised which detects movement of a latch inside a buckle apparatus or of a tongue plate inserted into a buckle apparatus, or the like.

Further, a structure has been devised in which, in this sort of warning mechanism, a permanent magnet is provided at an ejector which moves when pressured by the latch or by the tongue plate inserted into the device main body, and a magnetic sensor (an MRE element, a Hall element or the like) is provided at a predetermined position inside the buckle apparatus. Due to movement of the permanent magnet in accordance with movement of the latch or ejector, a change in a magnetic field is detected by the magnetic sensor.

However, a space in which members such as the permanent magnet and the like can move in the extremely limited space inside the buckle apparatus is extremely small. Moreover, when the permanent magnet is moved with the latch or the ejector, a displacement amount of the permanent magnet is small. Consequently, the change in the magnetic field of the permanent magnet that is to be detected by the magnetic sensor is small. Therefore, if mounting accuracy of the magnetic sensor and the permanent magnet is not very strict, movement of the latch or ejector cannot be reliably detected by the magnetic sensor.

SUMMARY OF THE INVENTION

In consideration of the above-described circumstances, a purpose of the present invention is to realize a buckle apparatus which includes a detection mechanism capable of consistently detecting when a tongue plate is inserted in a device main body.

A buckle apparatus of a first aspect includes: an apparatus main body at which a tongue plate is insertable, the tongue plate being assembled to a webbing belt which restrains a body of a vehicle occupant by being drawn from a predetermined accommodation region in the vehicle and fitted over the body of the vehicle occupant; a latch which is moveable toward and away from the tongue plate inserted at the apparatus main body, the latch engaging with the tongue plate by moving toward the tongue plate, for limiting movement of the tongue plate in a disengaging direction, which is opposite to an insertion direction of the tongue plate; a giant magnetoresistive element provided at the apparatus main body, the giant magnetoresistive element being structured to include an element main body formed by plurally laminating a ferromagnetic substance layer, which is formed by a ferromagnetic substance in thin film form, and a non-magnetic substance layer, which is formed by a non-magnetic substance in thin film form, alternately; a permanent magnet which forms a predetermined magnetic field therearound and is provided at the apparatus main body, the permanent magnet forming the predetermined magnetic field therearound and being disposed in the apparatus main body so as to face the giant magnetoresistive element in a direction which is inclined with respect to the insertion direction; and a shielding member which interlocks with the tongue plate inserted at the apparatus main body, the shielding member being provided so as to be moveable in conjunction with movement of the tongue plate, such that when the tongue plate moves to a position at which the latch and the tongue plate engage, the shielding member is interposed between the giant magnetoresistive element and the permanent magnet, and shields lines of magnetic force from the permanent magnet toward the giant magnetoresistive element.

According to a buckle apparatus of the structure described above, in a state in which the occupant of the vehicle has entrained the webbing belt to a forward side of the occupant's body, the occupant inserts the tongue plate into the apparatus main body of the buckle. In this state, the latch of the apparatus main body approaches and engages with the tongue plate, and movement of the tongue plate in a direction to disengage from the apparatus main body is limited by the latch. Hence, the webbing belt is engaged, and the body of the occupant is restrained (held) by the webbing belt.

The giant magnetoresistive element and the permanent magnet are provided at the apparatus main body of the buckle apparatus. Lines of magnetic force, which structure the magnetic field formed by the permanent magnet, penetrate the giant magnetoresistive element, and the giant magnetoresistive element exhibits a predetermined electrical resistance value.

When the tongue plate is inserted into the buckle apparatus main body, the shielding member provided at the apparatus main body interlocks directly or indirectly with the tongue plate, and the shielding member moves interlockingly with movement of the tongue plate in the apparatus main body. Further, when the tongue plate is moved into the apparatus main body to the position at which the tongue plate is engageable with the latch, the shielding member moves in between the giant magnetoresistive element and the permanent magnet, and the lines of magnetic force from the permanent magnet toward the giant magnetoresistive element are shielded by the shielding member.

When the lines of magnetic force from the permanent magnet toward the giant magnetoresistive element are shielded by the shielding member, lines of magnetic force that penetrate the giant magnetoresistive element are greatly reduced, and the electrical resistance exhibited by the giant magnetoresistive element is greatly changed. Therefore, by detecting the change in the electrical resistance value of the giant magnetoresistive element, the movement of the tongue plate to the position at which the latch is engageable can be detected on the basis of the movement of the shielding member. Thus, engagement of the tongue plate with the latch can be detected.

Furthermore, in the giant magnetoresistive element employed in the buckle apparatus of the present invention, a rate of change of the electrical resistance in response to changes in the lines of magnetic force penetrating the element is extremely large. Therefore, when the lines of magnetic force are shielded by the shielding member and the lines of magnetic force that penetrate the giant magnetoresistive element are reduced, the electrical resistance value changes very greatly. Consequently, it can be reliably detected that the latch has engaged with the tongue plate.

A buckle apparatus of a second aspect is the invention of the first aspect, further including an ejector provided on a movement path of the tongue plate inserted in the apparatus main body, the ejector being pushed by the tongue plate so as to move, the ejector being subjected to urging force in the disengaging direction, and the ejector pushing to move the tongue plate in the disengaging direction in a state in which engagement of the latch with the tongue plate has been released, and the shielding member is provided at the ejector.

According to the buckle apparatus of the structure described above, when the tongue plate is pushed into the apparatus main body, the ejector, which is provided on a movement path of the tongue plate, is pushed by the tongue plate. Thus, the ejector moves with the tongue plate in the direction of pushing, against the urging force which urges the ejector.

When engagement of the latch with the tongue plate is released, and restriction by the latch of movement of the tongue plate in the disengaging direction is released, then the urging force urging the ejector pushes the tongue plate in the disengaging direction via the ejector. Consequently, the tongue plate can be taken out from the apparatus main body.

In this buckle apparatus of the present invention, the shielding member is provided at the ejector, and the shielding member moves in accordance with movement of the ejector. Therefore, the shielding member moves interlockingly with the tongue plate, and thus a special mechanism is not required. As a result, construction of the buckle apparatus is simplified, and this contributes to miniaturization of the apparatus and a reduction in costs.

A buckle apparatus of a third aspect is the invention of the first aspect or the second aspect, in which an orientation of polarities of the permanent magnet intersects both the insertion direction and the direction in which the permanent magnet faces the giant magnetoresistive element.

In a buckle apparatus of the structure described above, the orientation of the polarities of the permanent magnet is oriented to intersect both the insertion direction of the tongue plate into the apparatus main body and the facing direction of the permanent magnet and the giant magnetoresistive element. Consequently, a number of the lines of magnetic force that penetrate the giant magnet resistance element when the shielding member is not shielding the lines of magnetic force is greater than in a case in which the orientation of the polarities of the permanent magnet is oriented in the insertion direction.

Accordingly, the electrical resistance value of the giant magnetoresistive element is greatly and rapidly changed between the state in which the lines of magnetic force of the magnetic field formed by the permanent magnet penetrate the giant magnetoresistive element and the state in which the shielding member shields these lines of magnetic force. As a result, engagement of the latch with the tongue plate can be detected even more reliably.

DESCRIPTION OF THE PREFERRED EMBODIMENT

Figure 1:
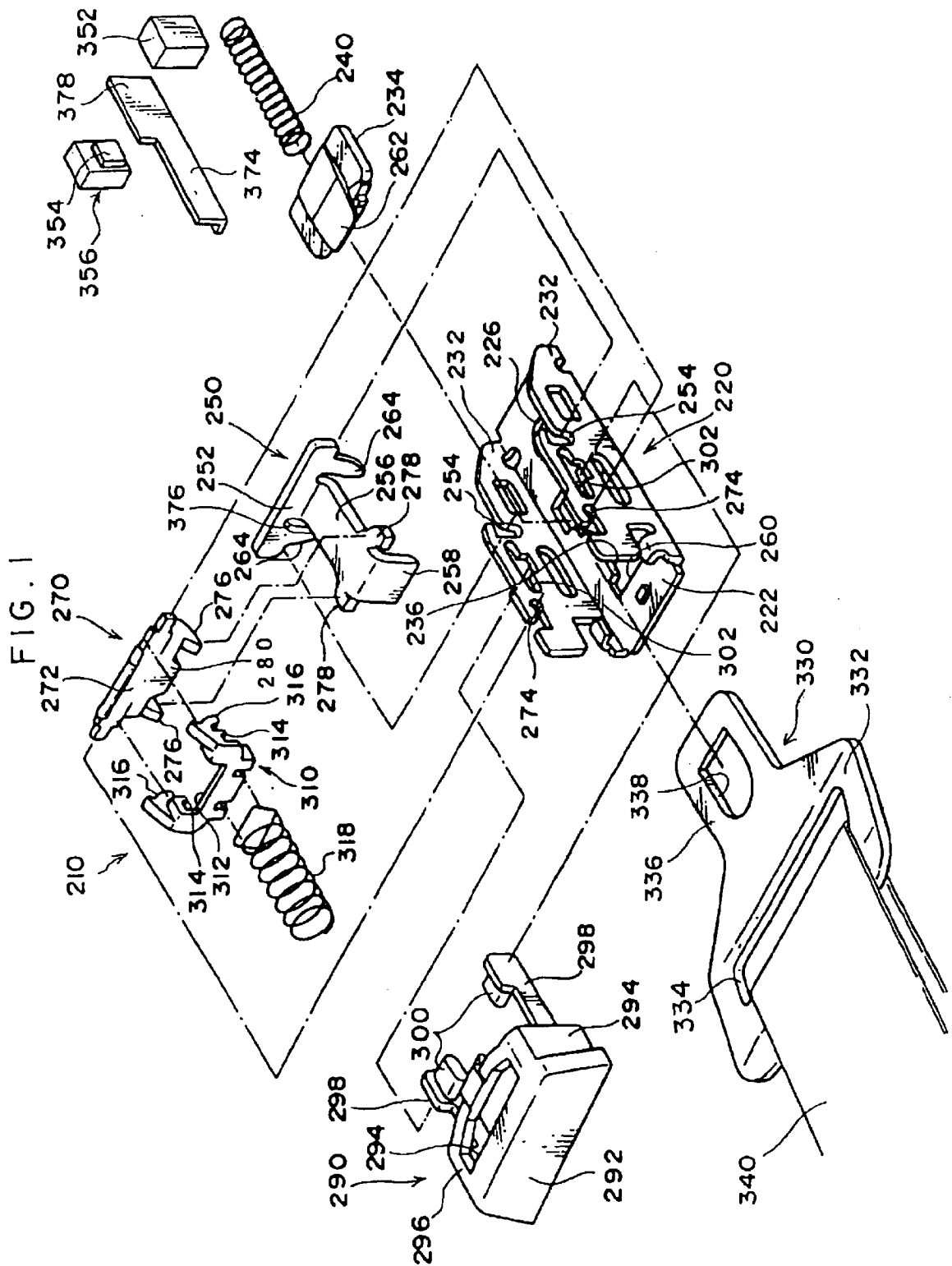
FIG. 1 is an exploded perspective view showing structures of principal components of a buckle apparatus relating to an embodiment of the present invention.
Figure 2:
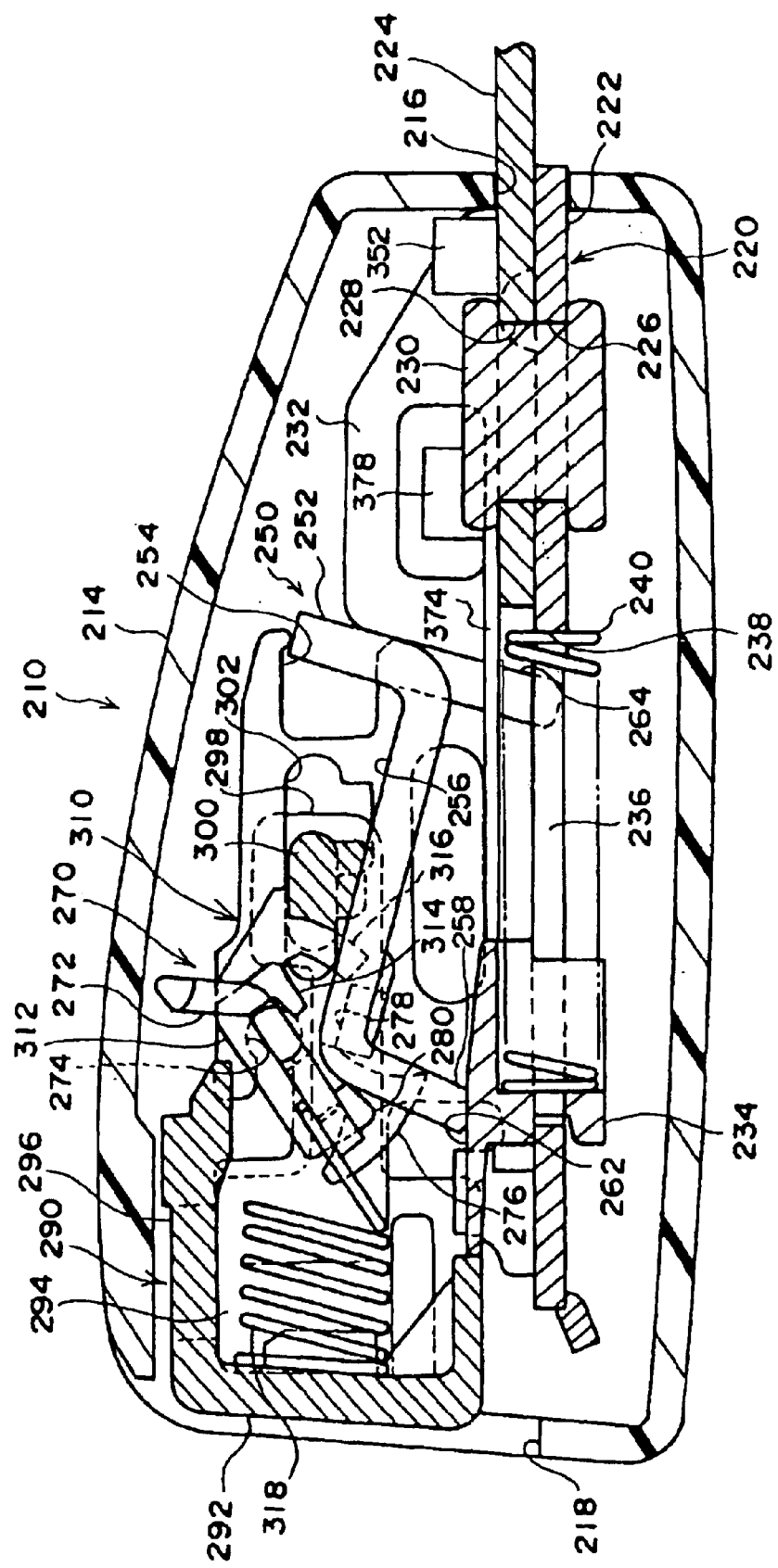
FIG. 2 is a side sectional view of the buckle apparatus relating to the embodiment of the present invention.

FIG. 1 shows structure of a buckle apparatus 210 relating to an embodiment of the present invention in an exploded perspective view. FIG. 2 shows the structure of the buckle apparatus 210 in a sectional view.

(Overall Structure of the Buckle Apparatus 210)

As shown in FIG. 2, the buckle apparatus 210 is provided with a case 214. The case 214 is a box-shaped tube-like member with openings formed at both ends in a longitudinal direction thereof. The opening at one end side in the longitudinal direction is an anchor insertion aperture 216. The opening at the other end side in the longitudinal direction is a tongue insertion aperture 218. A base 220 which structures the apparatus main body is accommodated inside the case 214.

Figure 8:
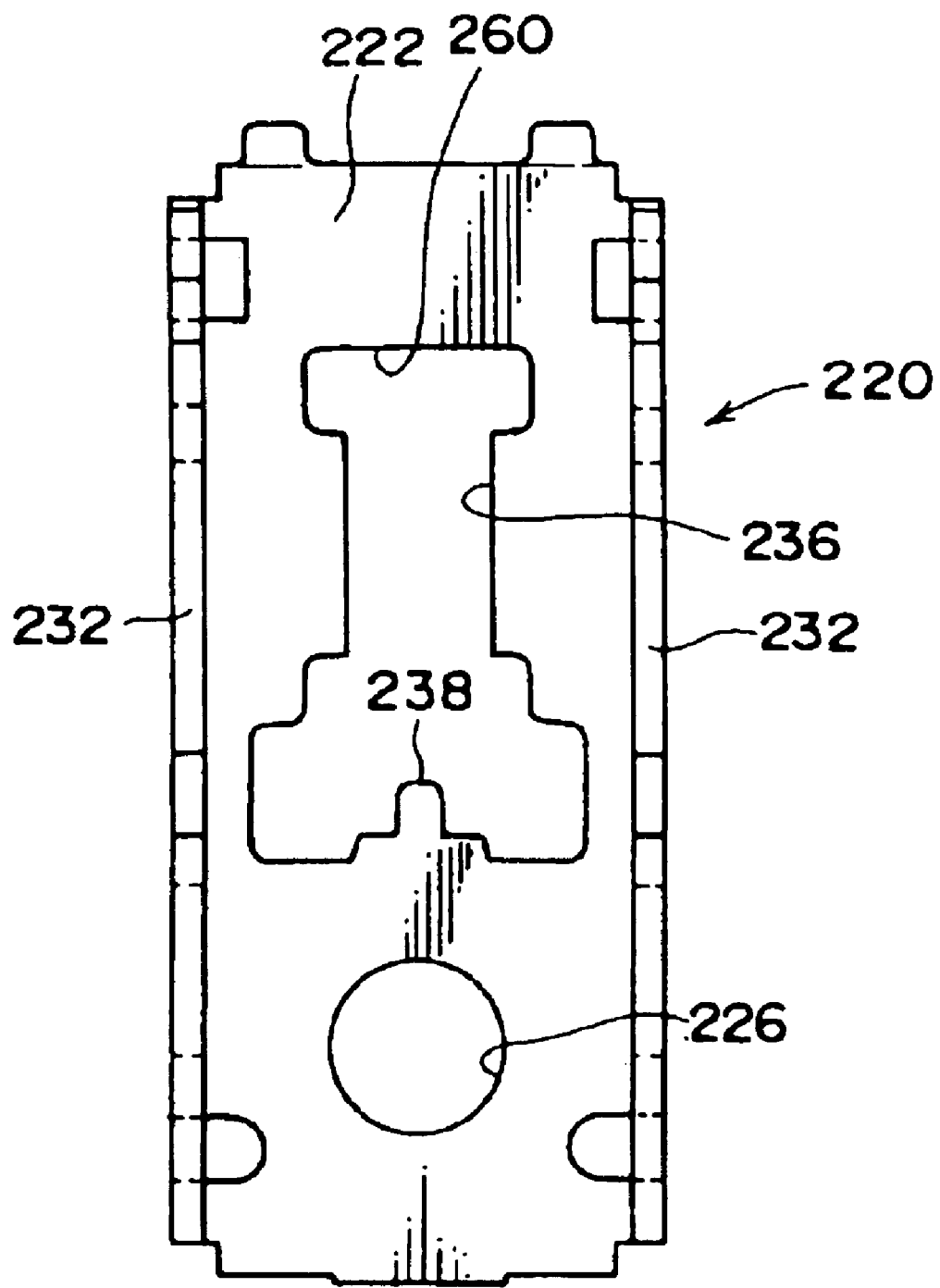
FIG. 8 is a plan view of a base which structures an apparatus main body.

As shown in FIGS. 2 and 8, the base 220 is provided with a flat plate-like baseplate 222 along the longitudinal direction of the case 214. A substantially plate-like anchor plate 224, which serves as an anchor member, is superposed at the one end side in the longitudinal direction of the baseplate 222. A through-hole 226 is formed in the baseplate 222. A long hole 228 is formed in the anchor plate 224 along the longitudinal direction of the baseplate 222. The baseplate 222 and the anchor plate 224 are mechanically coupled by a rivet 230 which passes through the through-hole 226 and the long hole 228. Another end of the anchor plate 224 is fixed to a vehicle body (which is not illustrated at all) at a side of a seat of the vehicle. Thus, the buckle apparatus 210 of the present invention is mounted at the vehicle.

Sidewalls 232 are provided in a thickness direction of the baseplate 222 from both of end portions in a lateral direction of the baseplate 222. An ejector 234 is disposed between the two sidewalls 232. A portion of the ejector 234 engages with a guide hole 236, which is formed in the baseplate 222. This portion of the ejector 234 is slideable along the guide hole 236, in a predetermined range along the longitudinal direction of the baseplate 222.

As shown in FIG. 8, an engaging projection 238 is formed so as to project from an end portion of the guide hole 236 at the one end side in the longitudinal direction of the baseplate 222. As shown in FIG. 2, one end of a compression coil spring 240 is engaged at the engaging projection 238. Another end of the compression coil spring 240 is pressed against one end of the ejector 234. Thus, the ejector 234 is urged toward the other end side in the baseplate 222 longitudinal direction by urging force of the compression coil spring 240.

As shown in FIGS. 1 and 2, the buckle apparatus 210 is provided with a latch 250. The latch 250 is provided with a base portion 252. Depending on the form of the latch 250, the base portion 252 is formed in a flat plate shape with a longitudinal direction of the base portion 252 generally being a longitudinal direction along a direction in which the two sidewalls 232 face each other, and a thickness direction of the base portion 252 being along the longitudinal direction of the baseplate 222. End portions of the base portion 252 in the longitudinal direction intrude at support holes 254, which are formed in the two sidewalls 232 to serve as support portions. Thus, the base portion 252 (i.e., the latch 250) is supported to be rotatable, with the longitudinal direction of the base portion 252 as an axial direction, through a predetermined angle until the base portion 252 is impeded by internal periphery portions of the support holes 254.

A flat plate-like coupling portion 256 extends from one lateral direction end of a longitudinal direction central portion of the base portion 252. The coupling portion 256 extends in the lateral direction of the base portion 252. An engaging piece 258 extends from a side of the coupling portion 256 which is opposite to a side of the coupling portion 256 at which the base portion 252 is disposed, toward the baseplate 222 side.

A distal end portion of the engaging piece 258 (more specifically, an end portion at a side of the engaging piece 258 which is opposite to a side thereof of a portion thereof that connects with the coupling portion 256) is positioned upward of a penetration hole 260 which is formed in the baseplate 222. When the latch 250 is displaced, the engaging piece 258 intrudes into the penetration hole 260.

A loading piece 262 is integrally provided at a surface of one side in a thickness direction of the aforementioned ejector 234 (a side thereof opposite to a side thereof at which the baseplate 222 is disposed). The loading piece 262 corresponds to a distal end portion of the engaging piece 258 of the latch 250. As mentioned above, urging force of the compression coil spring 240 acts on the ejector 234.

The loading piece 262 is provided such that, in a state in which the ejector 234 is located at a position that is attained in a state in which basically no forces other than the urging force of the compression coil spring 240 are acting thereon, the loading piece 262 opposes the distal end portion of the engaging piece 258 approximately along the thickness direction of the baseplate 222. In this state in which the loading piece 262 opposes the distal end portion of the engaging piece 258, the loading piece 262 obstructs the distal end portion of the engaging piece 258, and movement of the engaging piece 258 (that is, movement of the latch 250) in a direction approaching the baseplate 222 is restricted.

Stoppers 264 extend from both end sides in the longitudinal direction of the base portion 252. The stoppers 264 are formed such that distal end sides thereof are positioned on a path along which the ejector 234 slides against the urging force of the compression coil spring 240. When the ejector 234 has slid a predetermined distance against the urging force of the compression coil spring 240, the ejector 234 abuts against the stoppers 264.

A lock member 270 is disposed at a side of the coupling portion 256 of the latch 250 which is opposite to a side thereof at which the baseplate 222 of the base 220 is disposed. The lock member 270 is provided with a base portion 272. The base portion 272 is substantially square bar-shaped with a longitudinal direction thereof being along the direction of facing of the sidewalls 232.

Both of end portions of the base portion 272 intrude into engaging holes 274 which are formed in the sidewalls 232. Relative to the penetration hole 260, the engaging holes 274 are formed at the other end side in the longitudinal direction of the sidewalls 232. The base portion 272 is supported at the sidewalls 232 so as to be rotatable about an axis parallel with the longitudinal direction of the base portion 272. A pair of substantially hand fan-shaped lock pieces 276 are formed at the two end sides in the longitudinal direction of the base portion 272. Abutting pieces 278 extend from both of end portions in the lateral direction of the coupling portion 256 (the latch 250). The lock pieces 276 abut against the abutting pieces 278.

In addition, an abutting portion 280 is formed at a central portion in the longitudinal direction of the base portion 272. In a state in which the engaging piece 258 of the latch 250 is separated from the baseplate 222, the abutting portion 280 abuts against the engaging piece 258.

As shown in FIGS. 1 and 2, the buckle apparatus 210 is provided with a release button 290. The release button 290 is provided with a pressing portion 292 for operation. The pressing portion 292 is plate-like and has a pressing surface which faces toward the baseplate 222 longitudinal direction other end side. A longitudinal direction of the pressing portion 292 is along the facing direction of the sidewalls 232.

Side walls 294 extend toward the baseplate 222 longitudinal direction one end side from both of end vicinities in the longitudinal direction of the pressing portion 292. These side walls 294 face each other along the aforementioned facing direction of the sidewalls 232. The side walls 294 are connected by an upper wall 296 at a side of the side walls 294 which is opposite to a side thereof at which the baseplate 222 is disposed. Altogether, these form a three-sided box shape which opens toward the baseplate 222.

Arms 298 extend from respective end portions of the two side walls 294, which end portions are at a side of the side walls 294 which is opposite to a side thereof at which the pressing portion 292 is disposed. The arms 298 extend so as to face each other along the facing direction of the side walls 294. An engaging protrusion 300 is formed at a distal end portion of each of the two arms 298. The engaging protrusions 300 each extend toward the other of the arms 298. The engaging protrusions 300 intrude into guide holes 302 formed in the sidewalls 232. The guide holes 302 are long holes which are long along the longitudinal direction of the baseplate 222. The engaging protrusions 300 are restricted by inner periphery portions of the guide holes 302, and are movable in a predetermined range along the longitudinal direction of the baseplate 222. Accordingly, a movement direction of the release button 290 is restricted by the guide holes 302 to the longitudinal direction of the baseplate 222.

A stopper 310 is disposed between the pressing portion 292 and the lock member 270. The stopper 310 is provided with a plate-like base portion 312 having a longitudinal direction along the facing direction of the side walls 294. A pair of engaging pieces 314 is formed at two end sides in the longitudinal direction of the base portion 312. As viewed along the longitudinal direction of the base portion 312, the engaging pieces 314 are formed with inverted U shapes which open toward the baseplate 222. These engaging pieces 314 engage with the base portion 272 of the lock member 270, and thus the stopper 310 is supported by the lock member 270.

Interfering portions 316 are formed at vicinities of the two engaging pieces 314 of the stopper 310. The interfering portions 316 are capable of interfering with the engaging protrusions 300 of the release button 290 described above.

A compression coil spring 318 is disposed between the stopper 310 and the pressing portion 292 of the release button 290. One end of the compression coil spring 318 abuts against a rear face of the pressing surface of the pressing portion 292. The other end therefrom of the compression coil spring 318 abuts against the base portion 312 of the stopper 310. Accordingly, the compression coil spring 318 urges the stopper 310 in a direction to separate from the pressing portion 292.

(Structure of Tongue Plate 330)

A tongue plate 330 is inserted between the sidewalls 232 described above from the baseplate 222 longitudinal direction other end side. As shown in FIG. 1, the tongue plate 330 is provided with a base portion 332 which is formed by a metal plate. A long slit hole 334 is formed in the base portion 332. In the state in which the tongue plate 330 is inserted between the sidewalls 232, the length of the slit hole 334 is along the facing direction of the sidewalls 232. A longitudinal direction central portion of a long belt-form webbing belt 340 passes through the slit hole 334.

A base end portion of the webbing belt 340 is anchored at a winding shaft of an unillustrated webbing winding apparatus. An accommodating urging force from winding shaft urging means, such as a spiral coil spring or the like, acts on the webbing belt 340 to urge the webbing belt 340 in a winding direction toward the winding shaft.

An insertion plate portion 336 is formed at the base portion 332. A width dimension of the insertion plate portion 336 is smaller than a separation of the sidewalls 232. To be precise, of the tongue plate 330, only the insertion plate portion 336 is inserted between the sidewalls 232 (see FIG. 3).

A penetration hole 338 is formed in the insertion plate portion 336, in a thickness direction thereof. When the insertion plate portion 336 has reached a predetermined position toward the baseplate 222 longitudinal direction one end side between the sidewalls 232, the aforementioned engaging piece 258 can pass through the penetration hole 338. Disengagement of the tongue plate 330 from the buckle apparatus 210 is restricted by the engaging piece 258 penetrating the penetration hole 338.

(Structure of Detection Mechanism)

Figure 4:
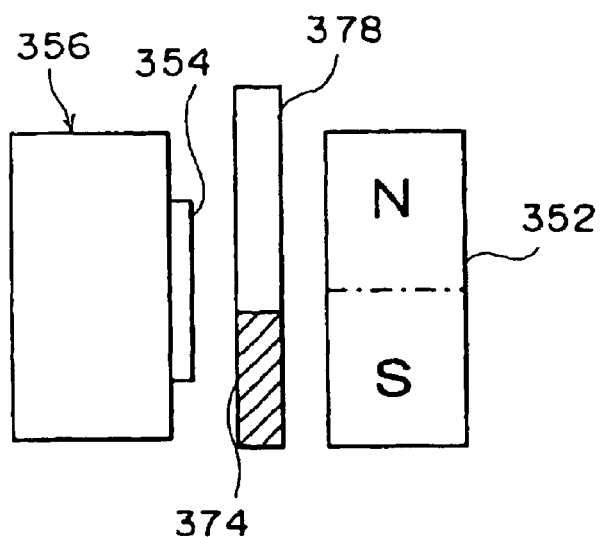
FIG. 4 is a schematic elevational view showing positional relationships of a permanent magnet, a giant magnetoresistive element and a shielding member used in the embodiment of the present invention, and an orientation of polarities of the permanent magnet.

As shown in FIG. 1, the buckle apparatus 210 is provided with a permanent magnet 352. As shown in FIG. 2, the permanent magnet 352 is disposed in a vicinity of the anchor insertion aperture 216 in the case 214. As shown in FIG. 4, an N pole of the permanent magnet 352 is at one side thereof in a thickness direction of the baseplate 222 (which is not shown in FIG. 4) and an S pole is at the other side thereof along the same direction.

Figure 6:
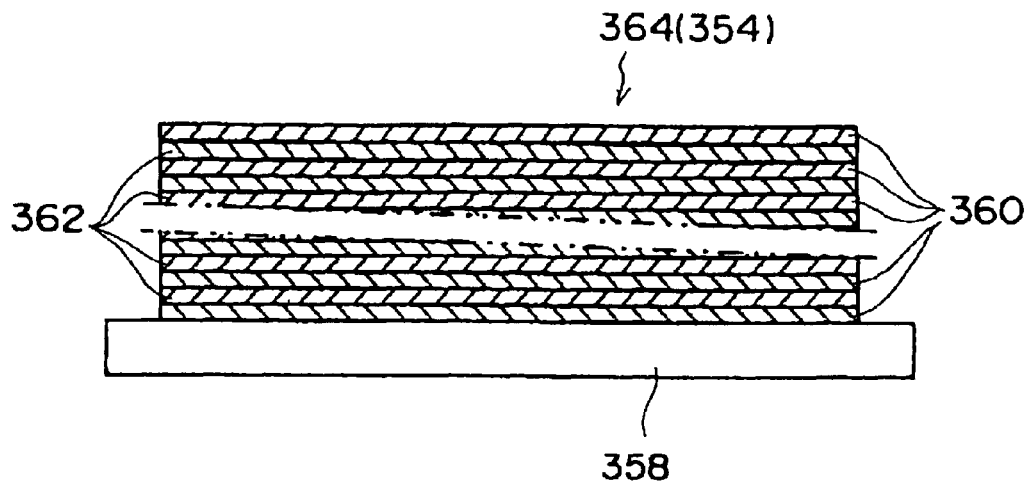
FIG. 6 is a sectional view showing a schematic construction of an element main body of the giant magnetoresistive element used in the embodiment of the present invention.

As shown in FIG. 1, a detection portion 356 is disposed sideward of the permanent magnet 352 along the facing direction of the sidewalls 232, and is structured with a giant magnetoresistive element (GMR element) 354. As shown in FIG. 6, the GMR element 354 is formed with an element main body 364 which is formed by plurally laminating alternate thin film-like ferromagnetic layers 360 and thin film-like non-magnetic layers 362 on a buffer layer 358. The ferromagnetic layers 360 are formed by a ferromagnetic metal, such as iron, cobalt, nickel, permalloy and the like. The non-magnetic layers 362 are formed by a non-magnetic metal, such as copper, chromium and the like. The GMR element 354 is a kind of variable resistor whose electrical resistance can be changed. Thus, the electrical resistance value of the GMR element 354 changes in accordance with an amount of lines of magnetic force penetrating therethrough.

Figure 7:
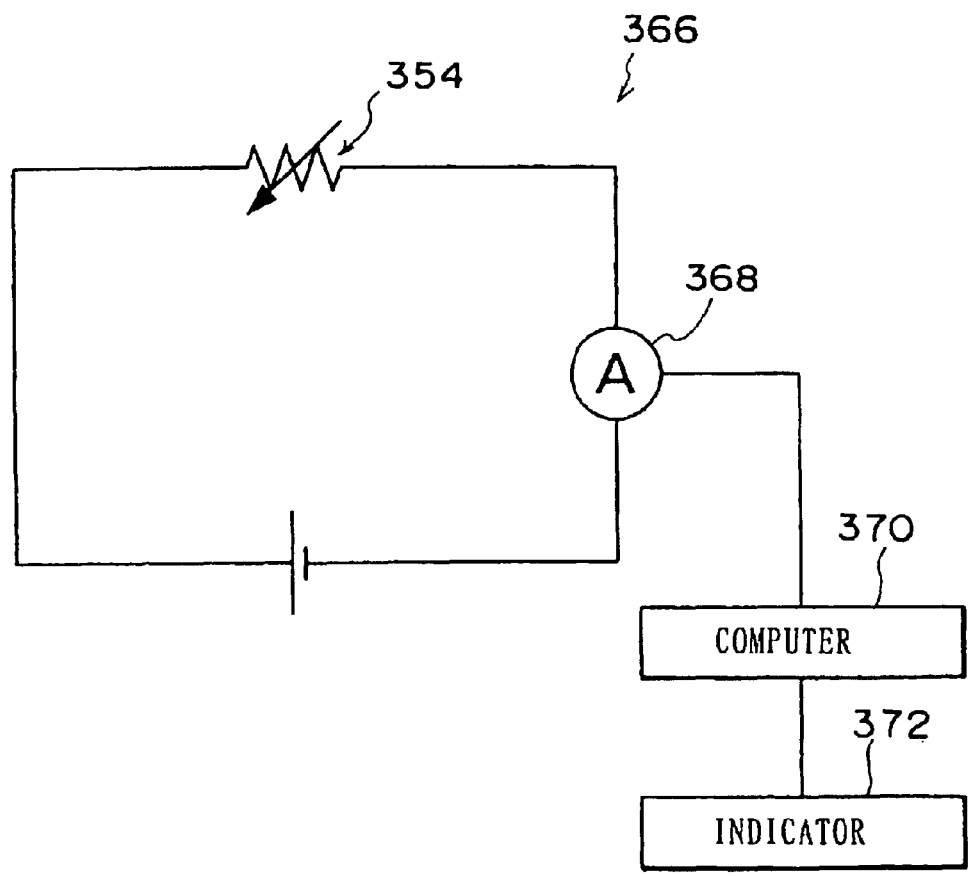
FIG. 7 is a circuit diagram showing an example of an electrical circuit that includes the giant magnetoresistive element.

Further, as shown in FIG. 7, an electrical circuit 366, which is structured to include the GMR element 354, is provided with a current detection element 368 which detects changes in a level of current flowing in the circuit. The current detection element 368 is connected to a computer 370, and sends an electrical signal to the computer 370 in accordance with the level of current that is detected. The computer 370 is connected to an indicator 372 which is provided at an instrument panel of the vehicle (not shown). The indicator 372 lights up or is extinguished on the basis of the electrical signals from the current detection element 368.

As shown in FIG. 1, a lever 374 is provided at the aforementioned ejector 234. The lever 374 is formed in a thin plate shape which has thickness along the facing direction of the sidewalls 232 and is long along the longitudinal direction of the baseplate 222 (i.e., the insertion direction of the tongue plate 330 and a disengaging direction opposite thereto).

One end of the lever 374 (an end portion at the tongue insertion aperture 218 side thereof) is fixed to the upper face of the ejector 234. Another end of the lever 374 passes through a cutaway portion 376, which is formed between the coupling portion 256 and one of the stoppers 264 of the aforementioned latch 250, and extends to a rear face side of the base portion 252 of the latch 250.

A shielding plate 378 is fixed at another end portion of the lever 374, to serve as a shielding member. The shielding plate 378 is formed in a plate shape having thickness along the facing direction of the sidewalls 232.

Figure 3:
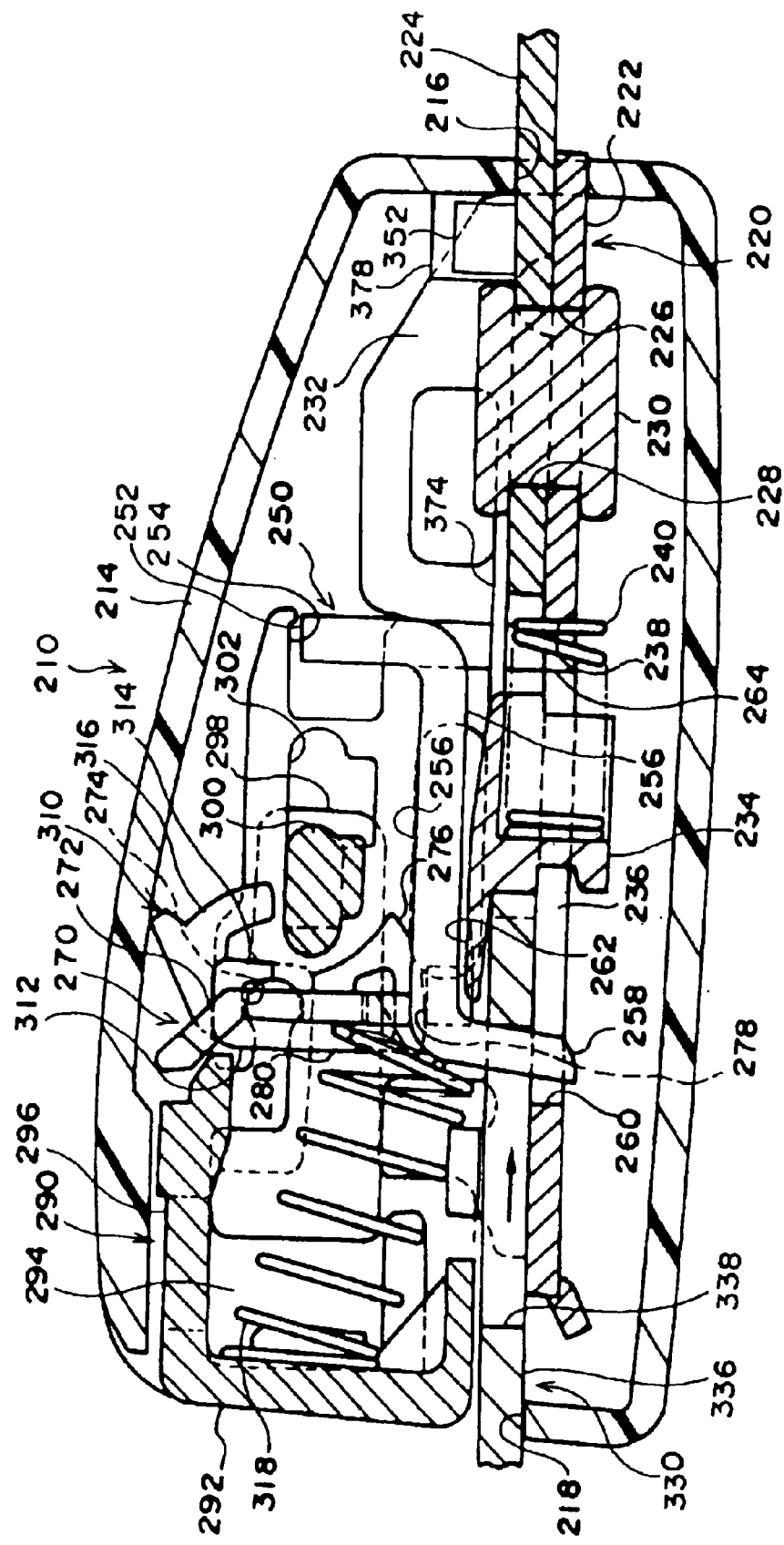
FIG. 3 is a sectional view of the buckle apparatus of FIG. 2 in a state in which a tongue plate has been inserted.
Figure 5:
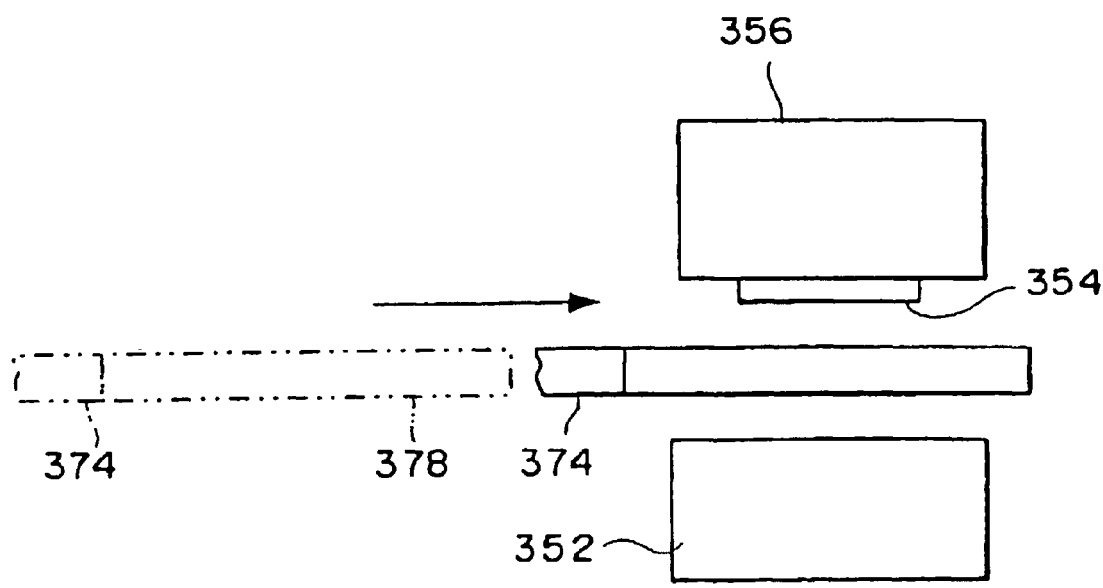
FIG. 5 is a schematic plan view showing a change from a state in which the shielding member is not interposed between the permanent magnet and the giant magnetoresistive element to a state in which the shielding member is interposed therebetween.

As shown in FIGS. 3 and 5, the lever 374 is set to a length such that, when the tongue plate 330 has moved to a position such that the engaging piece 258 can pass through the penetration hole 338 and the tongue plate 330 has pushed and moved the ejector 234, the shielding plate 378 is interposed between the permanent magnet 352 and the GMR element 354.

As shown in FIG. 3, when, in the non-engaged state shown in FIG. 2, the insertion plate portion 336 of the tongue plate 330 is inserted at the buckle apparatus 210 from the tongue insertion aperture 218 of the case 214, a distal end portion of the insertion plate portion 336 abuts against and pressures an end portion of the ejector 234. The insertion plate portion 336 slides the ejector 234 toward the baseplate 222 longitudinal direction one end side, against the urging force of the compression coil spring 240.

When the ejector 234 has slid a predetermined amount toward the baseplate 222 longitudinal direction one end side, the state in which the loading piece 262 of the ejector 234 and the engaging piece 258 of the latch 250 face one another is released, the ejector 234 presses against the stoppers 264 of the latch 250, and the ejector 234 rotates the latch 250.

Consequently, the distal end portion of the engaging piece 258 moves closer to the baseplate 222. In this state, the penetration hole 338 of the insertion plate portion 336 and the penetration hole 260 formed in the baseplate 222 are superposed. Thus, in this state, as shown in FIG. 3, the rotated engaging piece 258 passes through the penetration hole 338 of the insertion plate portion 336 and the penetration hole 260 of the 222.

Because of the rotation of the latch 250, an abutting state of the engaging piece 258 of the latch 250 with the abutting portion 280 of the lock member 270 is released. Then, because the lock pieces 276 are receiving the urging force of the compression coil spring 318 via the stopper 310, the lock member 270 is rotated by the urging force of the compression coil spring 318, so as to rotate interlockingly with the latch 250, and the lock pieces 276 abut against the abutting pieces 278 of the latch 250. Hence, rotation of the latch 250 in a direction to separate the engaging piece 258 from the 222 is restricted. Thus, the tongue plate 330 is in an engaged state with the buckle apparatus 210.

If this engaged state of the tongue plate 330 is a state in which the tongue plate 330 has pulled the webbing belt 340, against the accommodating urging force of the winding shaft urging means (such as a spiral coil spring or the like) which urges the winding shaft, such that the webbing belt 340 is located forward of the occupant sitting in the seat, a body-restraining state is attained by the webbing belt 340, and the webbing belt 340 restrains the occupant.

Thus, as shown in FIG. 2, in a state in which the insertion plate portion 336 of the tongue plate 330 is not inserted into the case 214, the permanent magnet 352 and the GMR element 354 face one another with a space therebetween. Accordingly, lines of magnetic force of a magnetic field formed by the permanent magnet 352 penetrate the GMR element 354, and the GMR element 354 has a predetermined electrical resistance value. In this state, the current flowing in the electrical circuit 366 in accordance with the electrical resistance value of the GMR element 354 is detected by the current detection element 368, and an electronic signal according to this current value is transmitted to the computer 370. Furthermore, in this state, the computer 370 that has received this electronic signal from the current detection element 368 causes the indicator 372 to light up.

In contrast, when the insertion plate portion 336 of the tongue plate 330 is inserted into the case 214, the tongue plate 330 pushes against the ejector 234, and the lever 374 moves together with the ejector 234. Further, when the inserted tongue plate 330 has pushed to move the ejector 234 as far as the position at which the engaging piece 258 is engageable with the penetration hole 338, the shielding plate 378 provided at the other end portion of the lever 374 is sandwiched between the permanent magnet 352 and the GMR element 354, and blocks lines of magnetic force toward the GMR element 354 from the permanent magnet 352.

Accordingly, lines of magnetic force that penetrate the GMR element 354 are reduced, and the electrical resistance of the GMR element 354 changes correspondingly. A current value of the current flowing in the electrical circuit 366 in the state in which the electrical resistance of the GMR element 354 has changed thus is detected by the current detection element 368. The current detection element 368 transmits an electronic signal according to this current value to the computer 370. Further, in this state, the computer 370 that has received this electronic signal from the current detection element 368 causes the indicator 372 to turn off.

Essentially, when the tongue plate 330 is inserted as far as the position at which the engaging piece 258 is engageable with the penetration hole 338, the engaging piece 258 engages with the penetration hole 338, and the webbing belt 340 becomes engaged. Consequently, as described above, the indicator 372 is extinguished. When the indicator 372 is extinguished, it can be discerned that the body-restraining state has been attained by the webbing belt 340. That is, because the indicator 372 lights up basically only when the body-restraining state is not attained by the webbing belt 340, the occupant of the vehicle can be warned if the webbing belt 340 is not in the body-restraining state by the indicator 372 lighting up.

The GMR element 354 employed in this buckle apparatus 210 is remarkable in that the rate of change of the electrical resistance value in response to changes in lines of magnetic force penetrating therethrough is extremely large. Accordingly, when the shielding plate 378 shields the lines of magnetic force, and the lines of magnetic force penetrating the GMR element 354 are decreased, the electrical resistance value is varied very greatly. Consequently, as described above, it can be reliably detected that the engaging piece 258 of the latch 250 has engaged with the penetration hole 338 of the tongue plate 330.

Moreover, in this buckle apparatus 210, the orientation of the poles of the permanent magnet 352 is in the thickness direction of the 222. That is, the orientation of the polarities of the permanent magnet 352 is a direction which intersects both the direction in which the permanent magnet 352 and the GMR element 354 face one another and the movement direction of the ejector 234 when pressured by the tongue plate 330. Consequently, lines of magnetic force from the permanent magnet 352 toward the GMR element 354, and returning from the GMR element 354 to the permanent magnet 352, emerge from the permanent magnet 352 relatively uniformly along the movement direction of the ejector 234. Therefore, many lines of magnetic force penetrate the GMR element 354 in the state in which the shielding plate 378 is not shielding.

As a result, the electrical resistance of the GMR element 354 is greatly and precipitously changed between the state in which the lines of magnetic force of the magnetic field formed by the permanent magnet 352 penetrate the GMR element 354 and the state in which these lines of magnetic force are shielded by the shielding plate 378. Thus, it can be even more assuredly detected when the buckle apparatus 210 is engaged with the penetration hole 338 of the tongue plate 330.

Furthermore, in this buckle apparatus 210, because the shielding plate 378, which is a shielding means, is fixed to the ejector 234 via the lever 374, a particular structure to move the shielding plate 378 interlockingly with the tongue plate 330 is not necessary. Therefore, structure is simplified, and this contributes greatly to miniaturization and cost reduction of this buckle apparatus 210.

What is claimed is:

1. A buckle apparatus comprising:
   an apparatus main body into which a tongue plate is insertable, the tongue plate being assembled to a webbing belt that restrains a body of a vehicle occupant by being draw from a predetermined region in the vehicle and fitted over the body of the vehicle occupant;
   a latch which is moveable toward and away from the tongue plate inserted into the apparatus main body, the latch engaging with the tongue plate by moving toward the tongue plate, for limiting movement of the tongue plate in a disengaging direction, which is opposite to an insertion direction of the tongue plate;
   a giant magnetoresistive element provided at the apparatus main body, the giant magnetoresistive element being structured to include an element main body formed by alternately laminating ferromagnetic substance layers, which are formed by a ferromagnetic substance in this film form, and non-magnetic substance layers, which are formed by a non-magnetic substance in this film form;

a permanent magnet which forms a predetermined magnetic field therearound and is provided at the apparatus main body, the permanent magnet forming the predetermined magnetic field therearound and being disposed in the apparatus main body so as to face the giant magnetoresistive element, the magnet having two opposing magnetic poles that are aligned along an axis that is substantially parallel with a direction that said tongue plate is inserted into said main body, and substantially orthogonal to said layers of said magnetoresistive element, each of said poles of said magnet simultaneously and continuously facing said giant magnetoresistive element, and a shielding member, which interlocks with the tongue plate inserted at the apparatus main body, the shielding member being provided so as to be movable in conjunction with movement of the tongue plate, such that when the tongue plate moves to a position at which the latch and the tongue plate engage, the shielding member is interposed between the giant magnetoresistive element and the permanent magnet, and shields lines of magnetic force from the permanent magnet toward the giant magnetoresistive element.

2. The buckle apparatus of claim 1, further comprising an ejector provided on a movement path of the tongue plate inserted in the apparatus main body, the ejector being pushed by the tongue plate so as to move, the ejector being subjected to urging force in the disengaging direction, and the ejector pushing to move the tongue plate in the disengaging direction in a state in which engagement of the latch with the tongue plate has been released, wherein the shielding member is provided at the ejector.

3. The buckle apparatus of claim 1, wherein the ferromagnetic substance comprises at least one of cobalt, nickel and permalloy.

4. The buckle apparatus of claim 1, wherein the non-magnetic substance comprises any of copper and chromium.

5. The buckle apparatus of claim 1, wherein the shielding member interlocks with the tongue plate directly.

6. The buckle apparatus of claim 1, wherein the shielding member interlocks with the tongue plate indirectly.

7. A buckle apparatus for fixing a tongue plate which is used at a seat belt apparatus of a vehicle, the buckle apparatus comprising:

an apparatus main body at which the tongue plate is inserted;

a latch disposed in the apparatus main body, the latch engaging with the inserted tongue plate and restricting movement of the tongue plate in a disengaging direction, which is opposite to an insertion direction of the tongue plate;

a permanent magnet disposed on a line extending along a movement path of the tongue plate in the apparatus main body, the magnet having two opposing magnetic poles that are aligned along an axis that is substantially parallel with a direction that said tongue plate is inserted into said main body;

a variable resistance element formed by alternately laminating thin film-form ferromagnetic substance layers and thin film-form non-magnetic substance layers and disposed facing the permanent magnet, the variable resistance element being electrically connected to an external current detection element, and exhibiting an electrical resistance value in accordance with an amount of lines of magnetic force penetrating there through, wherein said axis along said two opposing poles of said magnet is oriented substantially orthogonal to said layers of said variable resistance element; each of said poles of said magnet simultaneously and continuously facing said variable resistance elements, and a plate-like shielding member that shields lines of magnetic force, wherein, when the tongue plate is fixed at a predetermined insertion position, the shielding member is inserted between the permanent magnet and the variable resistance element and, when the tongue plate is separated from the predetermined insertion position, the shielding member is taken out from between the permanent magnet and the variable resistance element.

8. The buckle apparatus of claim 7, further comprising an ejector provides on a movement path of the tongue plate inserted in the apparatus main body, the ejector being pushed by the tongue plate so as to move, the ejector being subjected to urging force in the disengaging direction, and the ejector pushing to move the tongue plate in the disengaging direction in a state in which engagement of the latch with the tongue plate has been released, wherein the shielding member is provided at the ejector.

* * * * *